United States Patent
Fricke et al.

(10) Patent No.: US 8,785,512 B2
(45) Date of Patent: Jul. 22, 2014

(54) POROUS GELS BASED ON AROMATIC AND CYCLOALIPHATIC AMINES

(75) Inventors: Marc Fricke, Osnabrueck (DE); Mark Elbing, Syke (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 13/389,969

(22) PCT Filed: Aug. 2, 2010

(86) PCT No.: PCT/EP2010/061171
§ 371 (c)(1),
(2), (4) Date: Feb. 10, 2012

(87) PCT Pub. No.: WO2011/018371
PCT Pub. Date: Feb. 17, 2011

(65) Prior Publication Data
US 2012/0142800 A1 Jun. 7, 2012

(30) Foreign Application Priority Data
Aug. 13, 2009 (EP) .................. 09167834

(51) Int. Cl.
*C08G 18/12* (2006.01)
(52) U.S. Cl.
USPC ............................................. 521/163
(58) Field of Classification Search
USPC ....................................... 521/163
See application file for complete search history.

(56) References Cited

U.S. PATENT DOCUMENTS

| 4,808,636 | A | 2/1989 | Saito et al. |
| 8,026,318 | B2 * | 9/2011 | Conner et al. ............... 525/453 |
| 2010/0148109 | A1 * | 6/2010 | Schadler et al. ............. 252/62 |
| 2012/0007012 | A1 | 1/2012 | Fricke et al. |
| 2012/0022179 | A1 | 1/2012 | Emge et al. |
| 2012/0193286 | A1 | 8/2012 | Prissok et al. |

FOREIGN PATENT DOCUMENTS

| DE | 2945614 A1 * | 5/1981 |
| EP | 0 288 067 | 10/1988 |
| WO | 2008 138978 | 11/2008 |
| WO | 2009 027310 | 3/2009 |

OTHER PUBLICATIONS

International Search Report issued on Feb. 1, 2011 in PCT/EP10/061171 filed on Aug. 2, 2010.
U.S. Appl. No. 13/381,231, filed Dec. 28, 2011, Fricke, et al.
U.S. Appl. No. 13/403,530, filed Feb. 23, 2012, Fricke, et al.
U.S. Appl. No. 13/422,704, filed Mar. 16, 2012, Fricke, et al.
U.S. Appl. No. 13/432,820, filed Mar. 28, 2012, Fricke, et al.

* cited by examiner

*Primary Examiner* — Randy Gulakowski
*Assistant Examiner* — Christina Wales
(74) *Attorney, Agent, or Firm* — Oblon, Spivak, McClelland, Maier & Neustadt, L.L.P.

(57) ABSTRACT

The invention relates to a porous gel comprising the following components, in reacted form:
  (a1) at least one polyfunctional isocyanate,
  (a2) at least one polyfunctional aromatic amine and
  (a3) at least one polyfunctional cycloaliphatic amine.
The invention further relates to a process for preparing porous gels, to the porous gels thus obtainable and to the use of the porous gels as an insulating material and in vacuum insulation panels.

20 Claims, No Drawings

POROUS GELS BASED ON AROMATIC AND CYCLOALIPHATIC AMINES

The invention relates to a porous gel comprising the following components, in reacted form:
- (a1) at least one polyfunctional isocyanate,
- (a2) at least one polyfunctional aromatic amine and
- (a3) at least one polyfunctional cycloaliphatic amine.

The invention further relates to a process for preparing porous gels, to the porous gels thus obtainable and to the use of the porous gels as an insulating material and in vacuum insulation panels.

Porous gels with pores in the size range of a few micrometers or significantly lower and a high porosity of at least 70% are particularly good thermal insulators on the basis of theoretical considerations.

Such porous materials with a small mean pore diameter may be present, for example, in the form of organic xerogels. In the literature, the term "xerogel" is not used uniformly throughout. In general, a xerogel is understood to mean a porous material which has been prepared by a sol-gel process, the liquid phase having been removed from the gel by drying below the critical temperature and below the critical pressure of the liquid phase ("subcritical conditions"). In contrast, reference is generally made to aerogels when the removal of the fluid phase from the gel has been performed under supercritical conditions.

In the sol-gel process, a sol is first prepared on the basis of a reactive organic gel precursor, and then the sol is gelated by a crosslinking reaction to form a gel. In order to obtain a porous material, for example a xerogel, from the gel, the liquid has to be removed. This step is referred to hereinafter in a simplifying manner as drying.

WO-95/02009 discloses isocyanate-based xerogels which are suitable especially for applications in the field of vacuum insulation. The publication additionally discloses a sol-gel-based process for preparing the xerogels using known polyisocyanates including aromatic polyisocyanates and an unreactive solvent. As further compounds with active hydrogen atoms, aliphatic or aromatic polyamines or polyols are used. The examples disclosed in the publication comprise those in which a polyisocyanate is reacted with diaminodiethyltoluene. The xerogels disclosed generally have mean pore sizes in the region of 50 µm. In one example, a mean pore diameter of 10 µm is specified.

WO2008/138978 discloses xerogels comprising from 30 to 90% by weight of at least one polyfunctional isocyanate and from 10 to 70% by weight of at least one polyfunctional aromatic amine, the volume-weighted mean pore diameter of which is at most 5 micrometers.

WO2009/027310 discloses xerogels originating from polyfunctional isocyanates and protected aliphatic amines.

The material properties, especially the mechanical stability of the known porous gels based on polyurea, are, however, not adequate for all applications. In addition, the underlying formulations, in the course of drying under subcritical conditions, exhibit shrinkage with reduced porosity and increased density.

It was therefore an object of the invention to provide a porous gel which has the abovementioned disadvantages only to a minor degree, if at all. More particularly, the porous gels should have an increased porosity compared to the prior art and a reduced density. Furthermore, the porous gels should have a low thermal conductivity even at pressures above the vacuum range, especially in a pressure range from about 1 mbar to about 100 mbar. This is desirable since a pressure increase occurs in vacuum panels in the course of time. More particularly, the porous gel should have a high porosity, low density and a sufficiently high mechanical stability. Furthermore, the porous gels should have a low flammability and a high thermal stability.

A further object consisted in providing a process which makes available a porous gel with low pore size, high porosity, low density and simultaneously high mechanical stability. In addition, the process should provide porous gels with a low thermal conductivity and lead to low shrinkage when the solvent is removed under subcritical conditions.

Accordingly, the inventive porous gels and the process according to the invention for preparing porous gels have been found.

Preferred embodiments can be taken from the claims and the description. Combinations of preferred embodiments do not leave the scope of this invention.

Porous Gels

According to the invention, the porous gel comprises the following components in reacted form:
- (a1) at least one polyfunctional isocyanate,
- (a2) at least one polyfunctional aromatic amine and
- (a3) at least one polyfunctional cycloaliphatic amine.

A porous gel in the context of the present invention is a material which is porous and is obtained by means of a sol-gel process. The inventive porous gel in the context of the present invention is present as a xerogel or as an aerogel. The inventive porous gel in the context of the present invention is preferably present as a xerogel.

In the context of the present invention, a xerogel is understood to mean a porous gel having a porosity of at least 70% by volume and a volume-weighted mean pore diameter of at most 50 micrometers, which has been prepared by a sol-gel method, the liquid phase having been removed from the gel by drying below the critical temperature and below the critical pressure of the liquid phase ("subcritical conditions").

In contrast, an aerogel is understood to mean a corresponding porous gel when the removal of the fluid phase from the gel has been conducted under supercritical conditions.

In the course of removal of the fluid phase from the gel, there are active capillary forces which influence the pore structure of the resulting porous gel. In the course of removal of the fluid phase from the gel under supercritical conditions, these capillary forces are very small. In the course of removal of the fluid phase from the gel under subcritical conditions, the capillary forces, depending on the stability and nature of the gel and the polarity of the solvent to be removed, bring about a shrinkage of the gel with a change in the pore structure.

One or more monomer units (a1) of the above-defined type thus form component (a1). The same applies to monomer units (a2) and (a3). Components or monomer units (a1), (a2) and (a3) are present in reacted form in the porous gel. "Reacted form" is understood to mean a polymeric or polymer-bound form.

In a preferred embodiment, the inventive porous gel comprises from 20 to 90% by weight of the component (a1) composed of at least one polyfunctional isocyanate, and from 9.99 to 45% by weight of the component (a2) composed of at least one polyfunctional aromatic amine, and (a3) from 0.01 to 35% by weight of at least one polyfunctional cycloaliphatic amine, based in each case on the total weight of components (a1), (a2) and (a3). The sum of the percentages by weight of components (a1), (a2) and (a3), based on the total weight of components (a1), (a2) and (a3), adds up to 100% by weight.

The porous gel preferably comprises from 40 to 80% by weight of component (a1) and from 19 to 40% by weight of component (a2), and from 1 to 20% by weight of component (a3), most preferably from 45 to 79% by weight of component (a1) and from 19 to 40% by weight of component (a2), and from 2 to 15% by weight of component (a3), based in each case on the total weight of components (a1), (a2) and (a3). The percentages by weight always reflect the amount of the components used, which are present in reacted form in the porous gel.

In the context of the present invention, functionality of a compound shall be understood to mean the number of reactive groups per molecule. In the case of monomer units (a1), the functionality is the number of isocyanate groups per molecule. In the case of the amino groups of monomer units (a2) or (a3), the functionality is the number of reactive amino groups per molecule. A polyfunctional compound has a functionality of at least 2.

If components (a1), (a2) or (a3) used are mixtures of compounds with different functionality, the functionality of the components is calculated in each case from the number-weighted mean of the functionality of the individual compounds. A polyfunctional compound comprises at least two of the abovementioned functional groups per molecule.

The mean pore diameter is determined by means of mercury intrusion measurement to DIN 66133 and is always a volume-weighted mean value in the context of the present invention. The mercury intrusion measurement to DIN 66133 is a porosimetry method and is performed in a porosimeter. In this method, mercury is pressed into a sample of the porous material. Small pores require a higher pressure to be filled with the mercury than large pores, and the corresponding pressure/volume diagram can be used to determine a pore size distribution and the volume-weighted mean pore diameter.

The volume-weighted mean pore diameter of the porous gel is preferably at most 5 micrometers. The volume-weighted mean pore diameter of the porous gel is more preferably at most 3.5 micrometers, most preferably at most 3 micrometers and especially at most 2.5 micrometers.

A minimum pore size with high porosity is desirable from the point of view of low thermal conductivity. However, for production reasons and in order to obtain a sufficiently mechanically stable porous gel, a practical lower limit in the volume-weighted mean pore diameter arises. In general, the volume-weighted mean pore diameter is at least 10 nm, preferably at least 50 nm. In many cases, the volume-weighted mean pore diameter is at least 100 nm, especially at least 200 nanometers.

The inventive porous gel preferably has a porosity of at least 70% by volume, especially from 70 to 99% by volume, more preferably at least 80% by volume, most preferably at least 85% by volume, especially from 85 to 95% by volume. The porosity in % by volume means that the reported proportion of the total volume of the porous gel consists of pores. Although a maximum porosity is usually desirable from the point of view of minimal thermal conductivity, the upper limit in the porosity arises through the mechanical properties and the processability of the porous gel.

According to the invention, components (a1) to (a3) are present in reacted (polymeric) form in the porous gel. Owing to the inventive composition, monomer units (a1) to (a3) are present in the porous gel bonded predominantly via urea linkages. A further possible linkage in the porous gel is that of isocyanurate linkages, which arise through trimerization of isocyanate groups of monomer units (a1). When the xerogel comprises further components, further possible linkages are, for example, urethane groups which are formed by reaction of isocyanate groups with alcohols or phenols.

Components (a1) to (a3) are preferably present in the porous gel linked by urea groups —NH—CO—NH— to an extent of at least 50 mol %. Components (a1) to (a3) are preferably present in the porous gel from 50 to 100 mol % linked by urea groups, especially from 60 to 100 mol %, even more preferably from 70 to 100 mol %, especially from 80 to 100 mol %, for example from 90 to 100 mol %.

The molar % lacking from 100 mol % are present in the form of further linkages, especially as isocyanurate linkages. The further linkages may, however, also be present in the form of other linkages of isocyanate polymers known to those skilled in the art. Examples include ester, urea, biuret, allophanate, carbodiimide, isocyanurate, uretdione and/or urethane groups.

The molar % of the linkages of the monomer units in the porous gel are determined by means of NMR spectroscopy (nuclear spin resonance) in the solid or in the swollen state. Suitable determination methods are known to those skilled in the art.

The use ratio (equivalence ratio) of NCO groups of component (a1) to amino groups of components (a2) and (a3) is preferably from 1.01:1 to 1.5:1. The equivalence ratio of NCO groups of component (a1) to amino groups of components (a2) and (a3) is more preferably from 1.1:1 to 1.4:1, especially from 1.1:1 to 1.3:1. An excess of NCO groups leads to lower shrinkage of the porous gel when the solvent is removed.

Component (a1)

According to the invention, the porous gel comprises at least one polyfunctional isocyanate in reacted form. Preferably, the porous gel comprises from 20 to 90% by weight, more preferably from 40 to 80% by weight, especially from 45 to 79% by weight, of at least one polyfunctional isocyanate in reacted form, based on the total weight of components (a1), (a2) and (a3).

Useful polyfunctional isocyanates include aromatic, aliphatic, cycloaliphatic and/or araliphatic isocyanates. Such polyfunctional isocyanates are known per se or can be prepared by methods known per se. The polyfunctional isocyanates can especially also be used in the form of mixtures, such that component (a1) in this case comprises different polyfunctional isocyanates. Polyfunctional isocyanates useful as monomer units (a1) have two (referred to hereinafter as diisocyanates) or more than two isocyanate groups per molecule of the component.

Especially suitable are diphenylmethane 2,2'-, 2,4'- and/or 4,4'-diisocyanate (MDI), naphthylene 1,5-diisocyanate (NDI), tolylene 2,4- and/or 2,6-diisocyanate (TDI), dimethyldiphenyl 3,3'-diisocyanate, diphenylethane 1,2-diisocyanate and/or p-phenylene diisocyanate (PPDI), tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methylcyclohexane 2,4- and/or 2,6-diisocyanate and/or dicyclohexylmethane 4,4'-, 2,4'- and 2,2'-diisocyanate.

Preferred polyfunctional monomer units (a1) are aromatic isocyanates. Particularly preferred polyfunctional isocyanates of component (a1) have the following embodiments:
i) polyfunctional isocyanates based on tolylene diisocyanate (TDI), especially 2,4-TDI or 2,6-TDI or mixtures of 2,4- and 2,6-TDI;
ii) polyfunctional isocyanates based on diphenylmethane diisocyanate (MDI), especially 2,2'-MDI or 2,4'-MDI or 4,4'-MDI or oligomeric MDI, which is also referred to as polyphenylpolymethylene isocyanate, or mixtures of two or three of the aforementioned diphenylmethane diisocyanates, or crude MDI which is obtained in the preparation of MDI, or mixtures of at least one oligomer of MDI and at least one of the aforementioned low molecular weight MDI derivatives;

iii) mixtures of at least one aromatic isocyanate according to embodiment i) and at least one aromatic isocyanate according to embodiment ii).

As a polyfunctional isocyanate, particular preference is given to oligomeric diphenylmethane diisocyanate. Oligomeric diphenylmethane diisocyanate (referred to hereinafter as oligomeric MDI) is one oligomeric condensation product or a mixture of a plurality of oligomeric condensation products and hence derivatives of diphenylmethane diisocyanate (MDI). The polyfunctional isocyanates may preferably also be formed from mixtures of monomeric aromatic diisocyanates and oligomeric MDI.

Oligomeric MDI comprises one or more polycyclic condensation products of MDI having a functionality of more than 2, especially 3 or 4 or 5. Oligomeric MDI is known and is frequently referred to as polyphenylpolymethylene isocyanate or else as polymeric MDI. Oligomeric MDI is typically formed from a mixture of MDI-based isocyanates with different functionality. Typically, oligomeric MDI is used in a mixture with monomeric MDI.

The (mean) functionality of an isocyanate which comprises oligomeric MDI may vary in the range from about 2.2 to about 5, especially from 2.4 to 3.5, especially from 2.5 to 3. Such a mixture of MDI-based polyfunctional isocyanates with different functionalities is especially crude MDI, which is obtained in the preparation of MDI.

Polyfunctional isocyanates or mixtures of a plurality of polyfunctional isocyanates based on MDI are known and are sold, for example, by BASF Polyurethanes GmbH under the name Lupranat®.

The functionality of component (a1) is preferably at least two, especially at least 2.2 and more preferably at least 2.5. The functionality of component (a1) is preferably from 2.2 to 4 and more preferably from 2.5 to 3.

The content of isocyanate groups in component (a1) is preferably from 5 to 10 mmol/g, especially from 6 to 9 mmol/g, more preferably from 7 to 8.5 mmol/g. It is known to those skilled in the art that the content of isocyanate groups in mmol/g and the so-called equivalence weight in g/equivalent are in a reciprocal ratio. The content of isocyanate groups in mmol/g is calculated from the content in % by weight to ASTM D-5155-96 A.

In a preferred embodiment, component (a1) consists of at least one polyfunctional isocyanate selected from diphenylmethane 4,4'-diisocyanate, diphenylmethane 2,4'-diisocyanate, diphenylmethane 2,2'-diisocyanate and oligomeric diphenylmethane diisocyanate.

In this preferred embodiment, component (a1) more preferably comprises oligomeric diphenylmethane diisocyanate and has a functionality of at least 2.5.

Component (a2)

According to the invention, the porous gel comprises at least one polyfunctional aromatic amine. The porous gel comprises preferably from 9.99 to 45% by weight, more preferably from 19 to 40% by weight, of at least one polyfunctional aromatic amine, based on the total weight of components (a1), (a2) and (a3).

Suitable aromatic amines (a2) are especially isomers and derivatives of diaminodiphenylmethane. Isomers and derivatives of diaminodiphenylmethane preferred in the context of component (a2) are especially 4,4'-diaminodiphenylmethane, 2,4'-diaminodiphenylmethane, 2,2'-diaminodiphenylmethane and oligomeric diaminodiphenylmethane.

Suitable aromatic amines (a2) are also especially isomers and derivatives of tolueneamine. Isomers and derivatives of tolueneamine preferred in the context of component (a2) are especially toluenediamine, especially toluene-2,4-diamine and/or toluene-2,6-diamine and diethyltoluenediamine, especially 3,5-diethyltoluene-2,4-diamine and/or 3,5-diethyltoluene-2,6-diamine.

Component (a2) preferably comprises at least one polyfunctional aromatic amine, at least one of which is selected from isomers and derivatives of diaminodiphenylmethane, especially those mentioned above.

Component (a2) more preferably consists of at least one polyfunctional aromatic amine selected from 4,4'-diaminodiphenylmethane, 2,4'-diaminodiphenylmethane, 2,2'-diaminodiphenylmethane and oligomeric diaminodiphenylmethane.

Oligomeric diaminodiphenylmethane comprises one or more polycyclic methylene-bridged condensation products of aniline and formaldehyde. Oligomeric MDA comprises at least one oligomer of MDA, but generally a plurality of oligomers of MDA, having a functionality of more than 2, especially 3 or 4 or 5. Oligomeric MDA is known or can be prepared by methods known per se. Typically, oligomeric MDA is used in the form of mixtures with monomeric MDA.

The (mean) functionality of a polyfunctional amine which comprises oligomeric MDA can vary in the range from about 2.3 to about 5, especially from 2.5 to 3.5 and especially from 2.5 to 3. Such a mixture of MDA-based polyfunctional amines with different functionalities is especially crude MDA which is formed especially in the condensation of aniline with formaldehyde, typically catalyzed by hydrochloric acid, as an intermediate of the preparation of crude MDI. Component (a2) preferably comprises oligomeric diaminodiphenylmethane and has a functionality of at least 2.3.

Component (a3)

According to the invention, the porous gel comprises at least one polyfunctional cycloaliphatic amine in reacted form as component (a3).

The inventive porous gels preferably comprise from 0.01 to 35% by weight of component (a3), more preferably from 1 to 20% by weight, especially from 2 to 15% by weight, based in each case on the total weight of components (a1), (a2) and (a3).

The reacted form results from the fact that the amino components used in the corresponding monomer units are those which are reactive toward component (a1). The amino groups of the monomer units (a3) therefore have to be reactive toward the monomer unit (a1), and so primary or secondary amino groups are options.

A cycloaliphatic amine is understood to mean a compound with at least two cycloaliphatic amino groups. Cycloaliphatic amino groups are understood to mean amino groups bonded to a cycloaliphatic ring. The amino groups are preferably primary amino groups. The cycloaliphatic ring is advantageously an optionally substituted cyclohexyl ring.

A relatively high proportion of component (a3) has an advantageous effect with regard to the pore structure and especially with regard to mechanical properties and heat insulation capacity.

However, a significant increase in the proportion of component (a3), owing to its high reactivity, leads to potential deterioration in the homogeneity of the material structure and properties. Before homogenous mixing is possible, cured regions may form in the material, which leads to a deterioration in the properties.

Against this background, it has been found to be advantageous to use component (a3) in an amount of at least 0.1% by weight, preferably at least 1% by weight, especially at least 2% by weight, based in each case on the total weight of components (a1) to (a3). It has also been found to be advantageous to use component (a3) in an amount of at most 35% by weight, especially at most 20% by weight, more preferably at most 15% by weight, based in each case on the total weight of components (a1) to (a3).

It is possible that the same cycloaliphatic ring of one cycloaliphatic amine comprises only one amino group. In such a case, the compounds (a3) comprise at least two cycloaliphatic rings.

It is, however, also possible that the same cycloaliphatic ring is joined to at least two, especially exactly two, amino groups. Primary amino groups are joined to the cycloaliphatic ring by a chemical bond. Secondary amino groups are joined to the cycloaliphatic ring as a secondary amino group by a chemical bond or as an —NH-group by incorporation into the ring. Preferred examples thereof are isophoronediamine, piperazine and fully hydrogenated toluenediamine, especially fully hydrogenated toluene-2,4-diamine.

It is preferred when the at least 2 aforementioned amino groups are each attached to a different cycloaliphatic ring.

Component (a3) preferably comprises a compound, in reacted form, which has at least two amino groups according to the following structural element (I):

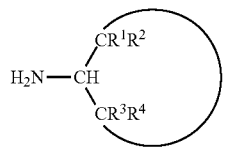

(I)

where $R^1$ to $R^4$ may be the same or different and are each independently selected from hydrogen or a linear or branched alkyl group having from 1 to 12 carbon atoms, and where the ring denotes a cycloaliphatic ring which may bear further substituents and may be joined directly or indirectly to at least one further cycloaliphatic ring. An indirect bond between two or more cycloaliphatic rings is preferably via an alkylene group, especially via a methylene group.

Preferably, component (a3) comprises at least one compound, in reacted form, which has at least two amino groups which are each joined to a cyclohexyl ring, which cyclohexyl ring may bear further substituents and/or may be joined directly or indirectly to at least one further, optionally substituted cyclohexyl ring.

In a particularly preferred embodiment, in the context of structural element (I), $R^1$ and $R^3$=H, and $R^2$ and $R^4$ are each independently selected from linear or branched alkyl groups having from 1 to 12 carbon atoms. More particularly, $R^2$ and $R^4$ are selected from methyl, ethyl, isopropyl, n-propyl, n-butyl, i-butyl or t-butyl.

By virtue of the aforementioned particularly preferred embodiment, the amino groups are sterically shielded. This has a positive effect on the achievable decrease in shrinkage when the solvent is removed from the gel, and on the porosity of the porous gel.

In a particularly preferred embodiment, the monomer units (a3) which form component (a3) comprise at least one compound of the following structure (II):

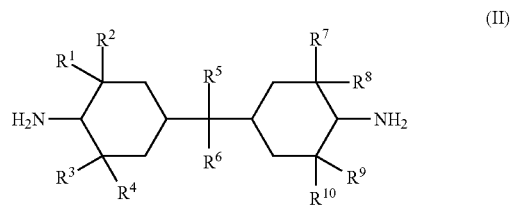

(II)

where $R^1$ to $R^{10}$ may be the same or different and are each independently selected from hydrogen or a linear or branched alkyl group having from 1 to 12 carbon atoms.

Preferably, $R^5$=$R^6$=H and $R^1$=$R^3$=$R^7$=$R^9$=H, and $R^2$, $R^4$, $R^8$ and $R^{10}$ are each independently selected from linear or branched alkyl groups having from 1 to 12 carbon atoms, especially methyl, ethyl, i-propyl, n-propyl, n-butyl, i-butyl or t-butyl.

A further preferred embodiment is hydrogenated oligomeric MDA (oligomeric diphenylmethane diisocyanate). Oligomeric MDA has already been described above. Hydrogenated oligomeric MDA has the following structure (III) or a structurally isomeric form thereof:

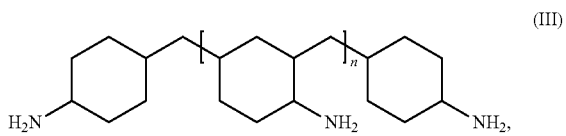

(III)

isomers of the structure (III) being just as possible as mixtures of isomers.

Hydrogenated oligomeric MDA is a mixture of oligomers of different chain length where n=0 to about 4. The amino functionality is preferably from 2 to 3.5, especially from 2.2 to 3.

Component (a3) is preferably 3,3',5,5'-tetraalkyl-4,4'-diaminodicyclohexylmethane, where the alkyl groups in 3,3',5 and 5' positions may be the same or different and are each independently selected from linear or branched alkyl groups having from 1 to 12 carbon atoms.

In a particularly preferred embodiment, component (a3) is 3,3',5,5'-tetraalkyl-4,4'-diaminodicyclohexylmethane, where the alkyl groups in the 3,3',5 and 5' positions are preferably selected from methyl, ethyl, i-propyl, n-propyl, n-butyl, i-butyl or t-butyl.

Very particularly preferred monomer units (a3) are 3,3',5, 5'-tetramethyl-4,4'-diaminodicyclohexylmethane and 3,3',5, 5'-tetraethyl-4,4'-diaminodicyclohexylmethane.

The polyfunctional cycloaliphatic amines are preferably prepared by ring hydrogenation of the corresponding polyfunctional aromatic amines. Corresponding processes for hydrogenating aromatic amines are widely known to the person skilled in the art. The corresponding polyfunctional aromatic amines are likewise known to the person skilled in the art and are either commercially available or can be prepared by synthesis methods known to the person skilled in the art. The preparation of the polyfunctional cycloaliphatic amines is described, for example, in EP 0134499 B1 at page 2, line 54 to page 7 line 58.

Process for Preparing Porous Gels

The process according to the invention comprises the following steps:

(a) providing component (a1) and, separately therefrom, components (a2) and (a3), each in a solvent (C);

(b) converting components (a1) to (a3) in the presence of the solvent (C) to a gel;
(c) drying the gel obtained in the previous step, preferably by converting the liquid present in the gel to the gaseous state at a temperature and a pressure below the critical temperature and the critical pressure of the liquid present in the gel.

In a preferred embodiment, component (a1) is provided in a first receptacle, and components (a2) and (a3) in a second receptacle, each in a solvent (C), and finally combined at the start of step (b). The process according to the invention accordingly preferably comprises the following steps:
(a-1) providing component (a1) and, separately therefrom, components (a2) and (a3), each in a solvent (C), components (a2) and (a3) preferably being mixed beforehand;
(a-2) providing a gel precursor (A) comprising components (a1) to (a3) in a solvent (C) by combining the components provided in step (a-1);
(b) converting the gel precursor (A) in the presence of the solvent (C) to a gel;
(c) drying the gel obtained in the previous step, preferably by converting the liquid present in the gel to the gaseous state at a temperature and a pressure below the critical temperature and the critical pressure of the liquid present in the gel.

Preferred embodiments of steps (a) to (c) are described in detail below.

Step (a)

According to the invention, in step (a), component (a1) is provided separately from components (a2) and (a3), each in a solvent (C). The gel precursor (A) is obtained by the mixing of components (a1) to (a3). The gel precursor (A) thus comprises the monomer units (a1) to (a3) described above under "porous gels" in the proportions likewise described above.

Monomer units (a1) to (a3) are present in the gel precursor (A) in monomeric form or have been converted beforehand by partial or nonequimolar reaction of isocyanate and amino groups to a prepolymer which forms the gel precursor (A), optionally with further monomer units (a1) to (a3). The gel precursor (A) is thus gelatable, i.e. it can be converted to a gel by crosslinking. The proportions of components (a1) to (a3) in the porous gel, in which they are present in polymeric form, correspond to the proportions of components (a1) to (a3) in the gel precursor (A) in which they are present in as yet unconverted form.

The viscosity of component (a1) used may vary within a wide range. Component (a1) used in step (a) of the process according to the invention preferably has a viscosity from 100 to 3000 mPa·s, more preferably from 200 to 2500 mPa·s.

The term "gel precursor (A)" indicates the gelatable mixture of components (a1) to (a3). The gel precursor (A) is subsequently converted in step (b), in the presence of the solvent (C), to a gel, a crosslinked polymer.

In step (a) of the process according to the invention, a mixture comprising the gel precursor (A) in a liquid diluent is thus provided. In the context of the present invention, the term "solvent (C)" comprises liquid diluents, i.e. both solvents in the narrower sense and dispersants. The mixture may especially be a true solution, a colloidal solution or a dispersion, for example an emulsion or suspension. The mixture is preferably a true solution. The solvent (C) is a compound which is liquid under the conditions of step (a), preferably an organic solvent.

It is known to those skilled in the art that aromatic amines, especially diamines, are formed when aromatic isocyanates, especially diisocyanates, are reacted with water. Accordingly, it is possible, instead of polyfunctional aromatic amines, to use corresponding aromatic polyfunctional isocyanates and an equivalent amount of water as component (a2), such that the desired amount of polyfunctional aromatic amine is formed in situ or in a preliminary reaction. In the case of an excess of component (a1) and simultaneous addition of water, component (a1) can be converted in situ partly to component (a2), which then reacts immediately with the remaining component (a1) to form urea linkages.

However, the polyfunctional amine is preferably not obtained from component (a2) in the presence of component (a1) in the solvent (C), but rather is added separately as component (a2). Accordingly, the mixture provided in step (a) preferably does not comprise any water.

Useful solvents (C) include in principle one compound or a mixture of a plurality of compounds, the solvent (C) being liquid under the pressure and temperature conditions under which the mixture is provided in step (a) (dissolution conditions for short). The composition of the solvent (C) is selected such that it is capable of dissolving or dispersing the organic gel precursor, preferably of dissolving it. Preferred solvents (C) are those which are a solvent for the organic gel precursor (A), i.e. those which dissolve the organic gel precursor (A) completely under reaction conditions.

The reaction product from step (b) is a gel, i.e. a viscoelastic chemical network which is swollen by the solvent (C). A solvent (C) which is a good swelling agent for the network formed in step (b) generally leads to a network with fine pores and small mean pore diameter, whereas a solvent (C) which is a poor swelling agent for the gel resulting from step (b) leads generally to a coarse-pore network with large mean pore diameter.

The selection of the solvent (C) thus influences the desired pore size distribution and the desired porosity. The solvent (C) is generally additionally selected such that precipitation or flocculation as a result of formation of a precipitated reaction product very substantially does not occur during or after step (b) of the process according to the invention.

In the case of selection of a suitable solvent (C), the proportion of precipitated reaction product is typically less than 1% by weight based on the total weight of the mixture. The amount of precipitated product formed in a particular solvent (C) can be determined gravimetrically by filtering the reaction mixture through a suitable filter before the gel point.

Useful solvents (C) include the solvents known from the prior art for isocyanate-based polymers. Preferred solvents are those which are a solvent for all components, (a1) to (a3), i.e. those which dissolve components (a1) to (a3) substantially completely under reaction conditions, such that the content of the organic gel precursor (A) in the overall mixture provided in step (a) including the solvent (C) is preferably at least 5% by weight. The solvent (C) is preferably inert, i.e. unreactive, toward component (a1).

Useful solvents (C) include, for example, ketones, aldehydes, alkyl alkanoates, amides such as formamide and N-methylpyrrolidone, sulfoxides such as dimethyl sulfoxide, aliphatic and cycloaliphatic halogenated hydrocarbons, halogenated aromatic compounds and fluorinated ethers. Likewise useful are mixtures of two or more of the aforementioned compounds.

Additionally useful as solvents (C) are acetals, especially diethoxymethane, dimethoxymethane and 1,3-dioxolane.

Dialkyl ethers and cyclic ethers are likewise suitable as solvents (C). Preferred dialkyl ethers are especially those having from 2 to 6 carbon atoms, especially methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are especially tetrahydrofuran, dioxane and tetrahydropyran.

Ketones and aldehydes having alkyl groups having up to 3 carbon atoms per substituent are likewise preferred as solvents (C).

In many cases, particularly suitable solvents (C) arise by using two or more compounds which are completely miscible with one another and are selected from the aforementioned solvents in the form of a mixture.

According to the invention, in step (a), component (a1) is provided separately from components (a2) and (a3).

The primary amino groups of monomer units (a3) are preferably present in protected form at the start of step (b). More preferably, the primary amino groups of component (a3) are present in protective form before performance of step (b). Most preferably, component (a3) is provided in step (a), wherein the primary amino groups are present in protected form, especially by dissolution in a medium for protecting primary amino groups, which is simultaneously the solvent (C).

"Primary amino groups present in protected form" is understood to mean that the primary amino groups are essentially not present in free form as —$NH_2$. The primary amino groups of monomer units (a3) which are present in protected form have a reduced reactivity toward isocyanates. The primary amino groups are preferably present in protected form by virtue of reversible connection to at least one further functional group or to at least one further molecule (so-called protecting groups).

"Reversible connection" is understood to mean that the corresponding functional groups or molecules (protecting groups) do reduce the reactivity of the primary amino groups toward isocyanates, but do not completely suppress the reaction, by either being eliminated in a controlled manner before the reaction of primary amino groups with isocyanate groups or—which is preferred—reforming reactive primary amino groups in the course of step (b) of the process according to the invention, which leads to a reduced reaction rate between primary amino groups and isocyanate groups. Such a reformation can proceed, for example, in the form of an equilibrium between protected form and reactive free form.

More preferably, the primary amino groups of monomer units (a3) are present in step (b) in the form of a ketimine and/or of an aldimine. Very particular preference is given to the provision of component (a3) in step (a) of the process according to the invention in the form of a ketimine and/or aldimine.

This is understood to mean that at least some, preferably all, of the primary amino groups of monomer units (a3) are present in the form of a ketimine and/or aldimine group. The ketimine and/or aldimine can be obtained especially by using a ketone and/or aldehyde as the solvent (C).

Suitable aldimines or ketimines derive from diamines or polyfunctional amines with primary amino groups and aldehydes or ketones, and can be obtained from these substances in a manner known per se, for example by heating in an inert organic solvent, optionally with removal of the water which forms, and optionally with catalysis, for example by means of an acid, but preferably by reaction in an excess of ketone and/or aldehyde as the solvent. The aldimines or ketimines may additionally also comprise further functional groups which are reactive toward isocyanate, for example hydroxyl or imino groups.

Additionally useful are ketimines or aldimines which, apart from protected primary amino groups, also comprise free secondary amino groups.

When the protecting group is detached before or during the performance of step (b) by adding a detaching agent, the protecting group in the case of the aldimines and ketimines can be detached especially by adding water as the detaching agent.

However, the aldimines and/or ketimines are preferably reacted without preceding addition of a detaching agent in a slowed reaction with isocyanates in step (b) of the process according to the invention. In this case, an equilibrium between free and protected primary amino groups in the solvent (C) is preferably exploited.

The reaction products between polyfunctional aldimines and/or ketimines and polyisocyanates are in principle chemically identical or substantially identical to those of a direct reaction of amino groups and isocyanate groups. However, the reduction in the reaction rate of primary aliphatic amino groups and isocyanate groups has a positive influence especially on the pore structure of the gel which results in step (b).

The protecting groups are preferably used in the form of a solvent (C) which is reactive toward primary amino groups. Most preferably, in step (a), component (a3) is provided together with component (a2) dissolved in a ketone and/or aldehyde as the solvent (C), and combined with component (a1) at the start of step (b).

Aldehydes or ketones which may be used to prepare the aldimines or ketimines are especially those corresponding to the general formula $R^2$—(CO)—$R^1$, where $R^1$ and $R^2$ are each hydrogen or alkyl groups having 1, 2, 3 or 4 carbon atoms. Suitable aldehydes or ketones are especially acetaldehyde, propionaldehyde, n-butyraldehyde, isobutyraldehyde, 2-ethylbutyraldehyde, valeraldehyde, isopentaldehyde, 2-methyl-pentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanacetaldehyde, ethyl glyoxylate, benzaldehyde, acetone, diethyl ketone, methyl ethyl ketone, methyl isobutyl ketone, methyl n-butyl ketone, ethyl isopropyl ketone, 2-acetylfuran, 2-methoxy-4-methylpentan-2-one, cyclohexanone and acetophenone. The aforementioned aldehydes and ketones may also be used in the form of mixtures.

In principle, it is possible to prepare an aldimine or ketimine beforehand in pure form and subsequently to provide it as a solution in a solvent (C). Preferably, the aforementioned aldehydes and/or ketones are, however, used as solvents (C) in the process according to the invention, in which case the aldimine or ketimine is formed when component (a2) is dissolved.

It is desirable that the aldehyde or the ketone possesses a boiling point below about 180° C., such that it can escape easily from the polymer in the course of step (c).

Preferably, components (a1) on the one hand, and components (a2) and (a3) on the other hand, are dissolved separately from one another in a solvent (C), especially an aldehyde and/or ketone.

Suitable solvents (C) are especially those aldehydes and/or ketones in which components (a1) to (a3) have sufficient solubility and in which reaction with the primary amino groups of monomer units (a2) forms an aldimine and/or ketimine, preferably at room temperature.

In principle, components (a1), (a2) and (a3) can be dissolved in different solvents (c1) and (c2), provided that the solvents are completely miscible with one another, and components (a1) to (a3) each have sufficient solubility in the solvent mixture.

In order to obtain, in step (b), a sufficiently stable gel which does not shrink greatly in the course of drying in step (c), the proportion of the gel precursor (A) in the overall mixture provided in step (a) of the process according to the invention generally must not be less than 5% by weight. The proportion of the gel precursor (A) in the overall mixture provided in step (a) of the process according to the invention including the solvent (C) is preferably at least 6% by weight, more preferably at least 8% by weight, especially at least 10% by weight.

On the other hand, the concentration of the gel precursor (A) in the mixture provided must not be selected at too high a level, since a porous gel with favorable properties is otherwise not obtained. In general, the proportion of the gel precursor (A) in the overall mixture provided in step (a) of the process according to the invention is at most 40% by weight. The proportion of the gel precursor (A) in the overall mixture provided in step (a) of the process according to the invention including the solvent (C) is preferably at most 35% by weight, more preferably at most 25% by weight, especially at most 20% by weight.

Optionally, the mixture provided in step (a) comprises, as a further component (B), also at least one catalyst (b1). However, preference is given to performing the conversion of the gel precursor (A) without the presence of a catalyst.

When a catalyst (b1) is used, typically trimerization catalysts which catalyze the formation of isocyanurates are used. Such trimerization catalysts used may, for example, be catalysts widely known to those skilled in the art, for example those listed below.

When trimerization catalysts are used as component (b1), known catalysts such as quaternary ammonium hydroxides, alkali metal and alkaline earth metal hydroxides, alkali metal and alkaline earth metal alkoxides, and alkali metal and alkaline earth metal carboxylates, e.g. potassium acetate and potassium 2-ethylhexanoate, particular tertiary amines and nonbasic metal carboxylates, e.g. lead octoate and triazine derivatives, especially symmetrical triazine derivatives, are suitable. Triazine derivatives are particularly suitable as trimerization catalysts.

Components (a1) to (a3) are preferably used such that the gel precursor (A) comprises from 20 to 90% by weight of component (a1), from 9.99 to 45% by weight of component (a2) and from 0.01 to 35% by weight of component (a3). The gel precursor (A) preferably comprises from 40 to 80% by weight of component (a1), from 19 to 40% by weight of component (a2) and from 1 to 20% by weight of component (a3). The gel precursor (A) more preferably comprises from 45 to 76% by weight of component (a1), from 19 to 40% by weight of component (a2) and from 5 to 15% by weight of component (a3).

The mixture provided in step (a) may also comprise typical assistants known to those skilled in the art as further constituents (B). Examples include surface-active substances, flame retardants, nucleating agents, oxidation stabilizers, lubricating and demolding aids, dyes and pigments, stabilizers, for example against hydrolysis, light, heat or discoloration, inorganic and/or organic fillers, reinforcing agents and biocides.

Further details of the assistants and additives mentioned above can be taken from the technical literature, for example from Plastics Additive Handbook, 5th edition, H. Zweifel, ed, Hanser Publishers, Munich, 2001.

The mixture can be provided in step (a) of the process according to the invention in a typical manner. For this purpose, a stirrer or another mixing apparatus is preferably used to achieve good mixing. The other mixing conditions are generally uncritical; for example, it is possible to mix at from 0 to 100° C. and from 0.1 to 10 bar (absolute), especially, for example, at room temperature and atmospheric pressure.

The mixture provided in step (a) can also be referred to as a sol. A sol shall be understood to mean either a colloidal solution in which the organic gel precursor (A) is dispersed ultrafinely in a solvent as a dispersion medium, or a true solution of the organic gel precursor (A) in a solvent.

Step (b)

According to the invention, in step (b), the components (a1) to (a3) are converted to a gel in the presence of the solvent (C). In step (b) of the process according to the invention, the organic gel precursor (A) is thus converted to a gel in a gelation reaction. The gelation reaction is a polyaddition reaction, especially a polyaddition of isocyanate groups and amino groups.

A gel shall be understood to mean a crosslinked system based on a polymer which is present in contact with a liquid (so-called solvogel or lyogel, or with water as a liquid: aquagel or hydrogel). In this case, the polymer phase forms a continuous three-dimensional network.

In step (b) of the process according to the invention, the gel forms typically by being left to stand, for example by simply leaving the vessel, reaction vessel or reactor in which the mixture is present to stand (referred to hereinafter as gelation apparatus). During the gelation (gel formation), the mixture is preferably not stirred or mixed because this might hinder the formation of the gel. It has been found to be advantageous to cover the mixture during the gelation or to close the gelation apparatus.

The duration of the gelation varies according to the type and amount of components used and the temperature and may be several days. It is typically from 1 minute to 10 days, preferably less than 1 day, especially from 5 minutes to 12 hours, more preferably at most 1 hour, especially from 5 minutes to 1 hour.

The gelation can be performed without supplying heat at a temperature in the region of room temperature, especially from 15 to 25° C., or at a temperature elevated relative to room temperature which is 20° C. or more, especially from 25° C. to 80° C. Typically, a higher gelation temperature shortens the duration of gelation. However, a higher gelation temperature is not advantageous in all cases, since an elevated gelation temperature can lead to gels with inadequate mechanical properties. Preference is given to performing the gelation at a temperature in the region of room temperature, especially from 15° C. to 25° C.

The pressure in the course of gelation can vary within a wide range and is generally not critical. It may, for example, be from 0.1 bar to 10 bar, preferably from 0.5 bar to 8 bar and especially from 0.9 to 5 bar (in each case absolute). In particular, it is possible to allow aqueous mixtures to gel at room temperature and atmospheric pressure.

During the gelation, the mixture solidifies to a more or less dimensionally stable gel. Gel formation can therefore be recognized in a simple manner by the contents of the gelation apparatus no longer moving when the gelation apparatus or a vessel with which a sample has been taken is tilted slowly. Moreover, the acoustic properties of the mixture change in the course of gelation: when the outer wall of the gelation apparatus is tapped, the gelled mixture gives a different ringing sound from the as yet ungelled mixture (so-called ringing gel).

In a preferred embodiment, the gel obtained in the gelation in step (b), before step (c) is performed, is subjected to a so-called aging in which the formation of the gel is completed. The aging is effected especially by exposing the gel to a higher temperature than in the preceding gelation for a certain time. To this end, for example, a heating bath or a heating cabinet can be used, or the apparatus or environment in which the gel is present can be heated in a suitable manner.

The temperature in the course of aging can vary within a wide range. In general, aging is effected at temperatures of from 30° C. to 150° C., preferably from 40° C. to 100° C. The aging temperature should be in the range from 10° C. to 100° C., especially from 20° C. to 80° C., above the gelation temperature. When gelation has been effected at room temperature, it is possible to effect aging especially at temperatures of from 40° C. to 80° C., preferably at about 60° C. The pressure in the course of aging is uncritical and is typically from 0.9 to 5 bar (absolute).

The duration of the aging depends on the type of the gel and may be a few minutes, but may also take a long time. The duration of the aging may, for example, be up to 30 days. Typically, the duration of the aging is from 10 minutes to 12 hours, preferably from 20 minutes to 6 hours and more preferably from 30 minutes to 5 hours.

According to the type and composition, the gel may shrink slightly during the aging and become detached from the wall of the gelation apparatus. Advantageously, the gel is covered during the aging, or the gelation apparatus in which the gel is present is closed.

Step (c)

According to the invention, in step (c), the gel obtained in the previous step is dried, preferably by converting the liquid present in the gel to the gaseous state at a temperature and a pressure below the critical temperature and the critical pressure of the liquid present in the gel, to obtain a xerogel. Drying is understood to mean the removal of the fluid phase of the gel.

Alternatively, it is likewise possible to dry the gel under supercritical conditions to obtain an aerogel, especially by exchanging the solvent for a suitable fluid phase, especially carbon dioxide, which is subsequently removed under supercritical conditions.

Preference is given to drying the resulting gel by converting the solvent (C) to the gaseous state at a temperature and a pressure below the critical temperature and the critical pressure of the solvent (C). Accordingly, preference is given to effecting the drying by removing the solvent (C) which was present in the reaction without preceding exchange for a further solvent.

Consequently, after step (b), the gel is preferably not contacted with an organic liquid in order to exchange the solvent (C) present in the gel, especially in the pores of the gel, for this organic liquid. This is true irrespective of whether the gel is aged or not. When a solvent exchange is omitted, the process can be performed in a particularly simple and inexpensive manner. When, however, a solvent exchange is performed, it is preferred to exchange the solvent (C) for a nonpolar solvent, especially for hydrocarbons such as pentane.

For the drying by conversion of the liquid present in the gel, preferably the solvent (C), to the gaseous state, useful methods are in principle both vaporization and evaporation, but not sublimation. Drying by vaporization or evaporation includes especially drying under atmospheric pressure, drying under reduced pressure, drying at room temperature and drying at elevated temperature, but not freeze-drying. According to the invention, drying is effected at a pressure and a temperature which are below the critical pressure and below the critical temperature of the liquid present in the gel. In step (d) of the process according to the invention, the solvent-containing gel is thus dried to form the organic xerogel as the process product.

To dry the gel, the gelation apparatus is typically opened and the gel is kept under the stated pressure and temperature conditions until the liquid phase has been removed by conversion to the gaseous state, i.e. the liquid phase is vaporized or evaporated. In order to accelerate the vaporization, it is frequently advantageous to remove the gel from the vessel. In this way, the gel/ambient air phase interface over which the vaporization and/or evaporation takes place is enlarged. For example, the gel can be placed onto a flat underlay or a sieve for drying. Useful drying processes are also the drying processes familiar to those skilled in the art, such as convection drying, microwave drying, vacuum drying cabinets or combinations of these processes.

The gel can be dried under air or, if it is oxygen-sensitive, also under other gases such as nitrogen or noble gases, and it is possible for this purpose, if appropriate, to use a drying cabinet or other suitable apparatus in which the pressure, the temperature and the solvent content of the environment can be controlled.

The temperature and pressure conditions to be selected in the course of drying depend upon factors including the nature of the liquid present in the gel. Preferably, drying is effected at a pressure which is below the critical pressure $p_{crit}$ of the liquid present in the gel, which is preferably the solvent (C), and at a temperature which is below the critical temperature $T_{crit}$. Accordingly, drying is effected under subcritical conditions. In this context, critical means: at the critical pressure and the critical temperature, the density of the liquid phase is equal to the density of the gas phase (so-called critical density), and, at temperatures above $T_{crit}$, the fluid phase can no longer be liquefied even in the case of application of ultra high pressures.

When acetone is used as the solvent, drying is effected at temperatures of from 0° C. to 150° C., preferably from 10° C. to 100° C. and more preferably from 15° C. to 80° C., and at pressures from high vacuum, for example from $10^{-3}$ mbar, to 5 bar, preferably from 1 mbar to 3 bar and especially from 10 mbar to about 1 bar (absolute). For example, drying can be effected at atmospheric pressure and from 0° C. to 80° C., especially at room temperature. Particular preference is given to drying the gel in step (d) at a pressure of from 0.5 to 2 bar (absolute) and at a temperature of from 0 to 100° C.

Other liquids present in the gel, especially solvents (C) other than acetone, require adjustments to the drying conditions (pressure, temperature, time) which can be determined by the person skilled in the art by simple tests.

The drying can be accelerated or completed by applying a vacuum. In order to further improve the drying action, this vacuum drying can be undertaken at a higher temperature than the drying at customary pressure. For example, the majority of the solvent (C) can first be removed at room temperature and atmospheric pressure within from 30 min to 3 hours, and then the gel can be dried at from 40 to 80° C. under a reduced pressure of from 1 to 100 mbar, especially from 5 to 30 mbar, within from 10 min to 6 hours. It will be appreciated that longer drying times are also possible, for example from 1 to 5 days. However, preference is frequently given to drying times of below 12 hours.

Instead of such a stepwise drying, the pressure can also be lowered continuously, for example in a linear or exponential manner, during the drying, or the temperature can be increased in such a manner, i.e. according to a pressure or temperature program. By its nature, the lower the moisture content of the air, the more rapidly the gel dries. The same applies mutatis mutandis to liquid phases other than water and to gases other than air.

The preferred drying conditions depend not only on the solvent but also on the nature of the gel, especially the stability of the network in relation to the capillary forces acting in the course of drying.

In the course of drying in step (c), the liquid phase is generally removed completely or down to a residual content of from 0.001 to 1% by weight based on the resulting xerogel.

Properties of the Porous Gels and Use

The porous gels obtainable by the process according to the invention preferably have a volume-averaged mean pore diameter of at most 5 micrometers. The volume-averaged mean pore diameter of the porous gels obtainable by the process according to the invention is preferably from 10 nm to 5 micrometers.

The particularly preferred volume-weighted mean pore diameter of the porous gels obtainable by the process according to the invention is at most 5 micrometers, especially at most 3.5 micrometers, most preferably at most 2.5 micrometers.

In general, the volume-weighted mean pore diameter is at least 20 nm, preferably at least 50 nm. In many cases, the volume-weighted mean pore diameter is at least 100 nm, especially at least 200 nm. The porous gels obtainable by the process according to the invention preferably have a porosity of at least 70% by volume, especially from 70 to 99% by volume, more preferably at least 80% by volume, most preferably at least 85% by volume, especially from 85 to 95% by volume.

The density of the organic porous gels obtainable by the process according to the invention is typically from 20 to 600 g/l, preferably from 50 to 500 g/l and more preferably from 100 to 300 g/l.

The process according to the invention gives rise to a coherent porous material and not just a polymer powder or polymer particles. The three-dimensional shape of the resulting porous gel is determined by the shape of the gel, which is determined in turn by the shape of the gelation apparatus. For example, a cylindrical gelation vessel typically gives rise to an approximately cylindrical gel which can then be dried to a xerogel in cylinder form.

The inventive porous gels and the porous gels obtainable by the process according to the invention have a low thermal conductivity, a high porosity and a low density with a simultaneously high mechanical stability. In addition, the porous gels have a low mean pore size. The combination of the aforementioned properties allows use as an insulating material in the field of thermal insulation, especially for applications in the vacuum sector where a minimum thickness of vacuum panels is preferred, for example in cool units or in buildings. For instance, use in vacuum insulation panels, especially as a core material for vacuum insulation panels, is preferred. Preference is also given to the use of the inventive porous gels as an insulating material.

Furthermore, the low thermal conductivity of the inventive porous gels enables applications at pressures of from 1 to 100 mbar and especially from 10 mbar to 100 mbar. The property profile of the inventive porous gels opens up especially applications in which a long lifetime of the vacuum panels is desired and which have a low thermal conductivity even in the case of a pressure increase of about 2 mbar per year even after many years, for example at a pressure of 100 mbar. The inventive porous gels and the porous gels obtainable by the process according to the invention have favorable thermal properties on the one hand, and favorable material properties such as simple processability and high mechanical stability, for example low brittleness, on the other hand.

EXAMPLES

The density $\rho$ of the porous gel in the unit g/ml was calculated by the formula $\rho=m/(\pi*r^2)*h$ where m is the mass of the porous gel, r is the radius (half the diameter) of the porous gel and h is the height of the porous gel.

The porosity in the unit % by volume was determined by the formula $P=(V_i/(V_i+V_s))*100$, where P is the porosity, $V_i$ is the specific volume of the porous gel in ml/g and is calculated according to $V_i=1/\rho$. $V_s$. $V_s$ is the specific volume in ml/g of the specimen. The specific volume used was the value $1/V_s=1.38$ g/ml. This value can be determined by He pycnometry.

The shrinkage during step (c) of the process according to the invention was determined by comparing the height of a cylindrical gel and the diameter cm before and after the removal of the solvent. The values reported relate to the relative volume of the shrunken cylinder compared to the gel body before the removal of the solvent, i.e. the shrinkage is reported as volume loss in %. The cylinders had, before shrinkage, a height of 4.7 cm and a diameter of 2.6 cm.

The following compounds were used:

a-1: oligomeric MDI (Lupranat® M50) with an NCO content of 31.5 g per 100 g to ASTM D-5155-96 A, a functionality in the range from 2.8 to 2.9 and a viscosity of 550 mPa·s at 25° C. to DIN 53018.

a-2: oligomeric diaminodiphenylmethane with a viscosity of 2710 mPa·s at 50° C. to DIN 53018, a functionality in the region of 2.4 and a potentiometrically determined amine number of about 560 mg KOH/g.

a-3: 3,3',5,5'-tetramethyl-4,4'-diaminodicyclohexylmethane

Example 1

2.4 g of compound a-1 were dissolved in 10.5 g of acetone in a beaker with stirring at 20° C. 1.3 g of compound a-2 and 0.1 g of compound a-3 were dissolved in 11 g of acetone in a second beaker. The two solutions from step (a) were mixed. A clear low-viscosity mixture was obtained. The mixture was left to stand at room temperature for 24 hours for curing. Subsequently, the gel was removed from the beaker and the liquid (acetone) was removed by drying at 20° C. for 7 days.

The resulting material had a porosity of 88% by volume and a density of 160 g/l. The shrinkage was 6%.

Example 2C 2.4 g of compound a-1 were dissolved in 10.5 g of acetone in a beaker with stirring at 20° C. 1.3 g of compound a-2 were dissolved in 11 g of acetone in a second beaker. The two solutions from step (a) were mixed. A clear low-viscosity mixture was obtained. The mixture was left to stand at room temperature for 24 hours for curing. Subsequently, the gel was removed from the beaker and the liquid (acetone) was removed by drying at 20° C. for 7 days.

Compared to example 1, the resulting material had a significantly shrunken form. The shrinkage was 48%. The porosity was 71% by volume with a corresponding density of 390 g/l.

Example 3

2.4 g of compound a-1 were dissolved in 10.5 g of acetone in a beaker with stirring at 20° C. 1.1 g of compound a-2 and 0.2 g of compound a-3 were dissolved in 11 g of acetone in a second beaker. The two solutions from step (a) were mixed. An immediate reaction took place. The mixture was left to stand at room temperature for 24 hours for curing. Subsequently, the gel was removed from the beaker and the liquid (acetone) was removed by drying at 20° C. for 7 days.

The resulting material had a porosity of 87% by volume and a density of 175 g/l. The shrinkage was 5%.

Example 4C 2.4 g of compound a-1 were dissolved in 10.5 g of acetone in a beaker with stirring at 20° C. 1.3 g of compound a-2 and 0.1 g of triethylenediamine were dissolved in 11 g of acetone in a second beaker. The two solutions from step (a) were mixed. An immediate reaction took place. The mixture was left to stand at room temperature for 24 hours for curing. Subsequently, the gel was removed from the beaker and the liquid (acetone) was removed by drying at 20° C. for 7 days.

Compared to example 1, the resulting material had a significantly shrunken form. The shrinkage was 45%. The porosity was 74% by volume with a corresponding density of 350 g/l.

Example 5

2.4 g of compound a-1 were dissolved in 10.5 g of acetone in a beaker with stirring at 20° C. 0.4 g of compound a-2 and 0.9 g of compound a-3 were dissolved in 11 g of acetone in a second beaker. The two solutions from step (a) were mixed. An immediate reaction took place. The mixture was left to stand at room temperature for 24 hours for curing. Subsequently, the gel was removed from the beaker and the liquid (acetone) was removed by drying at 20° C. for 7 days.

The resulting material had a porosity of 86% by volume and a density of 190 g/l. The shrinkage was 15%.

The use of the inventive cycloaliphatic polyfunctional amines in combination with polyfunctional aromatic amines leads to porous gels with significantly reduced shrinkage and increased porosity and reduced density.

The invention claimed is:

1. A porous gel, comprising:
   a polyfunctional isocyanate,
   a polyfunctional aromatic amine, and
   a polyfunctional cycloaliphatic amine,
   wherein the porous gel has a porosity of at least 70% by volume, and
   the polyfunctional isocyanate, the polyfunctional aromatic amine, and the polyfunctional cycloaliphatic amine are present as polymeric or polymer-bound components.

2. The porous gel of claim 1, wherein the porous gel is a xerogel.

3. The porous gel of claim 1, comprising:
   from 20 to 90% by weight of the polyfunctional isocyanate,
   from 9.99 to 45% by weight of the polyfunctional aromatic amine, and
   from 0.01 to 35% by weight of the polyfunctional cycloaliphatic amine,
   wherein a sum of total percentages by weight of the polyfunctional isocyanate, the polyfunctional aromatic amine, and the polyfunctional cycloaliphatic amine is 100%.

4. The porous gel of claim 1,
   wherein the polyfunctional cycloaliphatic amine comprises a compound comprising at least two amino groups of a structure comprising a ring,
   the structure comprising a ring is of formula:

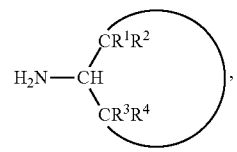

where $R^1$ to $R^4$ are each independently hydrogen or a linear or branched alkyl group having from 1 to 12 carbon atoms,
the ring is an optionally substituted cycloaliphatic ring, optionally joined to a further cycloaliphatic ring.

5. The porous gel of claim 1,
   wherein the polyfunctional cycloaliphatic amine comprises a compound comprising at least two amino groups, each joined to an optionally substituted cyclohexyl ring, optionally joined directly or indirectly to a further, optionally substituted cyclohexyl ring.

6. The porous gel of claim 1,
   wherein the polyfunctional cycloaliphatic amine comprises a compound of a structure:

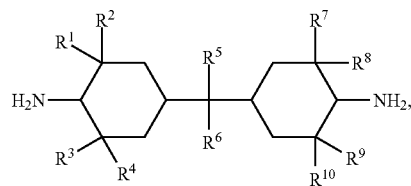

and
$R^1$ to $R^{10}$ are each independently hydrogen or a linear or branched alkyl group having from 1 to 12 carbon atoms.

7. The porous gel of claim 1,
   wherein the polyfunctional cycloaliphatic amine is 3,3',5,5'-tetraalkyl-4,4'-diaminodicyclohexylmethane,
   alkyl groups in the 3,3',5 and 5' positions each independently a linear or branched alkyl group having from 1 to 12 carbon atoms.

8. The porous gel of claim 1, wherein the polyfunctional cycloaliphatic amine is 3,3',5,5'-tetramethyl-4,4'-diaminodicyclohexylmethane.

9. The porous gel of claim 1, wherein the polyfunctional aromatic amine consists of at least one polyfunctional aromatic amine selected from the group consisting of 4,4'-diaminodiphenylmethane, 2,4'-diaminodiphenylmethane, 2,2'-diaminodiphenylmethan, and oligomeric diaminodiphenylmethane.

10. The porous gel of claim 1, wherein the polyfunctional aromatic amine comprises oligomeric diaminodiphenylmethane and has a functionality of at least 2.3.

11. The porous gel of claim 1, wherein the polyfunctional isocyanate consists of at least one polyfunctional isocyanate selected from the group consisting of diphenylmethane 4,4'-diisocyanate, diphenylmethane 2,4'-diisocyanate, diphenylmethane 2,2'-diisocyanate, and oligomeric diphenylmethane diisocyanate.

12. The porous gel of claim 1, wherein the polyfunctional isocyanate comprises oligomeric diphenylmethane diisocyanate and has a functionality of at least 2.5.

13. The porous gel of claim 1,
   wherein the polyfunctional isocyanate comprises oligomeric diphenylmethane diisocyanate, the polyfunctional aromatic amine comprises oligomeric diaminodiphenylmethane, and a sum of a functionality of the polyfunctional isocyanate and of a functionality of the polyfunctional aromatic amine is at least 5.5.

14. The porous gel of claim 1, wherein a volume-weighted mean pore diameter of the porous gel is at most 3 micrometers.

15. A process for preparing the porous gel of claim 1, comprising:

providing the polyfunctional isocyanate and, separately therefrom, the polyfunctional aromatic amine and the polyfunctional cycloaliphatic amine, each in a solvent;

converting the polyfunctional isocyanate, the polyfunctional aromatic amine, and the polyfunctional cycloaliphatic amine in the presence of the solvent, to obtain a gel; and drying the gel.

16. The process of claim 15, wherein drying the porous gel comprises converting the solvent to a gas at a temperature and a pressure below a critical temperature and a critical pressure of the solvent.

17. A porous gel obtained by the process of claim 15.

18. An insulating material, comprising the porous gel of claim 1.

19. A vacuum insulation panel, comprising the porous gel of claim 1.

20. The porous gel of claim 1, wherein the porosity is at least 80% by volume.

\* \* \* \* \*